United States Patent [19]

Heskett

[11] Patent Number: 5,135,654

[45] Date of Patent: * Aug. 4, 1992

[54] METHOD FOR TREATING FLUIDS

[75] Inventor: Don E. Heskett, Constantine, Mich.

[73] Assignee: KDF Fluid Treatment, Inc., Constantine, Mich.

[ * ] Notice: The portion of the term of this patent subsequent to Feb. 10, 2004 has been disclaimed.

[21] Appl. No.: 764,995

[22] Filed: Sep. 24, 1991

Related U.S. Application Data

[63] Continuation of Ser. No. 528,682, May 24, 1990, abandoned, which is a continuation-in-part of Ser. No. 352,719, May 12, 1989, abandoned, which is a continuation of Ser. No. 205,628, May 31, 1988, abandoned, which is a continuation of Ser. No. 70,591, Jul. 8, 1987, abandoned, which is a continuation of Ser. No. 779,226, Sep. 23, 1985, abandoned, which is a continuation of Ser. No. 605,652, Apr. 30, 1984, abandoned.

[51] Int. Cl.⁵ .............. C02F 1/28; C02F 1/70; C02F 1/72

[52] U.S. Cl. .................. 210/638; 210/757; 210/763

[58] Field of Search .............. 75/724, 725, 726, 733; 210/638, 652, 663, 688, 719, 720, 721, 722, 743, 754, 756, 757, 758, 759, 760, 763, 807, 903, 912, 913, 914, 510.1

[56] References Cited

U.S. PATENT DOCUMENTS

| | | | |
|---|---|---|---|
| 553,383 | 1/1896 | Bailey | 210/757 |
| 1,428,618 | 9/1922 | Wagner | 210/757 |
| 2,194,056 | 3/1940 | Quagla | 75/733 |
| 2,204,898 | 6/1940 | Lee | 75/733 |
| 2,552,709 | 5/1951 | Clements | 210/688 |
| 3,027,321 | 3/1962 | Selm | 210/720 |
| 3,294,680 | 12/1966 | Lancy | 210/720 |
| 3,575,853 | 4/1971 | Gaughan | 210/720 |
| 3,697,567 | 10/1972 | Taylor | 75/725 |
| 3,766,036 | 10/1973 | McKaveney | 210/723 |
| 3,788,982 | 1/1974 | Zsoldos | 210/688 |
| 3,802,910 | 4/1974 | Gerow | 210/914 |
| 3,857,704 | 12/1974 | Coulter | 210/719 |
| 3,873,581 | 3/1975 | Fitzpatrick | 75/724 |
| 3,905,827 | 9/1975 | Goffredo | 210/688 |
| 3,922,224 | 11/1975 | Lewandowski | 210/720 |
| 3,933,635 | 1/1976 | Marchant | 210/719 |
| 3,976,571 | 8/1976 | Rio | 210/688 |
| 3,989,623 | 11/1976 | Neal | 210/688 |
| 4,005,011 | 1/1977 | Sweeny | 210/913 |
| 4,026,797 | 5/1977 | Nikolic | 210/719 |
| 4,028,236 | 6/1977 | Townsend | 210/914 |
| 4,078,040 | 3/1978 | Milkov | 75/724 |
| 4,094,777 | 6/1978 | Sugier | 210/688 |
| 4,108,770 | 8/1978 | Roy | 210/757 |
| 4,219,419 | 8/1980 | Sweeny | 210/754 |
| 4,303,441 | 12/1981 | Lamisse | 75/733 |
| 4,382,865 | 5/1983 | Sweeny | 210/757 |
| 4,414,115 | 11/1983 | The | 210/688 |
| 4,421,652 | 12/1983 | Heskett | 210/688 |
| 4,521,387 | 6/1985 | Broecker | 502/345 |
| 4,642,192 | 2/1987 | Heskett | 210/758 |
| 4,871,710 | 10/1989 | Denny | 55/73 |

FOREIGN PATENT DOCUMENTS

| | | | |
|---|---|---|---|
| 2291156 | 11/1976 | France | 210/719 |
| 49-43472 | 11/1974 | Japan | 210/688 |
| 50-85570 | 7/1975 | Japan | 210/719 |
| 51-25476 | 3/1976 | Japan | 210/688 |
| 51-97251 | 8/1976 | Japan | 210/688 |
| 63-256177 | 10/1988 | Japan | 210/714 |

Primary Examiner—Ernest G. Therkorn
Attorney, Agent, or Firm—Lockwood, Alex, FitzGibbon & Cummings

[57] ABSTRACT

A fluid treating method for treating fluid to reduce the concentration of undesirable metal constitutents contained therein is disclosed. The method utilizes a bed of metal particulate matter. The metal particulate matter comprises copper. Preferably, the metal particulate also contains zinc and can be in the form of an alloy. The fluid treated is often water, preferably, drinking water. Among the metals that may be effected by the present method are aluminum, arsenic, barium, cadmium, chromium, copper, gold, iron, lead, mercury, selenium and silver.

2 Claims, 1 Drawing Sheet

METHOD FOR TREATING FLUIDS

This application is a continuation of pending Ser. No. 07/528,682, filed May 24, 1990, which is a continuation-in-part of Ser. No. 07/352,719, filed May 12, 1989, now abandoned, which is a continuation of Ser. No. 07/205,628, filed May 31, 1988, now abandoned, which is a continuation of Ser. No. 07/070,591, filed Jul. 8, 1987, now abandoned, which is a continuation of Ser. No. 06/779,226, filed Sep. 23, 1985, now abandoned, which is a continuation of Ser. No. 07/605,652, filed Apr. 30, 1984, now abandoned.

BACKGROUND AND DESCRIPTION OF THE INVENTION

The present invention generally relates to fluid treating and, more particularly, to apparatus and methods which are especially adapted for providing for improved treatment of fluids. Industrial and domestic water supplies often contain undesirable constituents which require treating prior to end use. Although capable of a variety of uses, this invention finds advantageous utility in the treatment of water to remove or inhibit the growth of undesirable constituents contained therein such as, for example, dissolved chlorine and bacteria constituents.

In this regard, industrial and utility processes often require large amounts of water for cooling. Many water cooling operations utilize heat exchange for primary heat regulation, with a resulting rise in the temperature of the cooling water passing through the equipment. This rise in temperature promotes the growth of organisms already in the water which in turn can result in fouling of the equipment such as by clogging of the system or by build-up of a biological slime layer on the heat exchange surfaces which greatly reduce their effectiveness.

Chlorination is the most common means of controlling bacteria in cooling water systems as well as in drinking water systems. While the biocial properties of hypochlorous acid are effective to kill bacteria the hypochlorous acid itself may be deliterious to other equipment or treatment systems being used. In addition excess chlorine in drinking water often imparts an undesirable taste and odor to the water and the effluent water can be harmful to the environment. In this regard, the EPA has established effluent limitations for residual chlorine and it is often necessary to utilize dechlorination procedures to remove excess residual chlorine resulting from over chlorination in order to comply with EPA guidelines.

Another advantageous utility of the present invention is in reducing the concentration of undersirable metals present in the water. This is of particular value in the treatment of drinking water. Specific standards have been set for many metals such that each metal must be below a specific concentration. It is highly desirable to have available a simple treatment that will reduce the concentration of many undersirable metals so that they will be within the established standards.

Similarly for other uses, the concentration of various metals need be at low levels to prevent interference with the proposed use of the fluid. Various commercial and industrial uses can be adversely affected by the presence of metallic contaminants such as aluminum, arsenic, barium, cadmium, chromium, copper, iron, lead, mercury, selenium and zinc. The presence of these and other undesirable metals in excess amounts can interfere with the use of the fluids in various industrial applications such as heat exchange fluids, lubricants, pressurization, and other applications.

Consequently, the presence of a method for substantially reducing the concentration of undesirable metals in water, particularly drinking water, and other fluids is of the utmost importance.

In the field of fluid treating, and particularly in the field of treating water for commercial, industrial and domestic use, a number of systems have been proposed, some or all of which have certain undesirable characteristics, drawbacks or disadvantages associated therewith.

For example, ion-exchange systems are commonly used to soften water and selectively remove specific impurities from the water. The active medium of the ion-exchanger is an ion-exchange resin which is designed to remove undesirable constituents from the fluid and replace those undesirable constituents with a less undesirable constituent. For instance, a cation exchange resin employed to remove the hardness-producing elements of calcium and magnesium may be designed to simultaneously give up sodium in exchange for the calcium and magnesium contained in the water which has passed through the ion-exchanger. Regardless of the specific ion-exchange resin used, eventually the bed of resin becomes exhausted and the unit must be removed from service and be regenerated to become use useful again. In addition to chemical exhaustion ion bacterial can quickly fill an ion-exchange resin tank and plug chemical feed nozzles and other orifices. The resin is also susceptible to chemical degradation such as by excess chlorine present from a bacterial treatment process. Accordingly, the ion-exchanger unit must be carefully maintained and monitored to assure continued acceptable performance.

Another popular type of process for treating water is reverse osmosis wherein pressure in excess of the osmotic pressure of the fluid is used to force untreated water, normally at ambient temperature, through a selective membrane in a direction opposite to that normally observed is osmotic processes. The selective membrane is designed to allow the water to permeate through while rejecting the dissolved undesirable constituents. The success of this process depends in large part upon the development of suitable membranes. Membranes utilized in reverse osmosis typically experience a variety of temperature, chemical and pressure stability problems as well as speed and capacity limitations. Just as bacteria can foul heat exchangers so can it produce a fouling film on reverse osmosis membranes. If the water supply is treated with chlorine as an antibacterial agent the dissolved chlorine, although highly effective in combating bacteria, often has a deleterious effect on reverse osmosis membranes. Additionally, reverse osmotic equipment also must be carefully set up, maintained, and monitored. Accordingly, regardless of the sophistication of the technology used, if the end user fails to maintain the system and perform the necessary sampling required to ensure that the system is functioning to design specifications a breakdown in treatment can occur.

Still another popular water treatment process is the application of activated carbon, which is widely used for taste and odor control as well as removal of organic contaminants from water by adsorbtion since activated carbon is characterized by a high adsorbtivity for gases, vapors, and colloidal solids. However, similiar to the resin in ion-exchangers, the adsorbtive capacity of the carbon is eventually depleted and the carbon either must be regenerated or replaced. Therefore a system incorporating activated carbon also requires careful monitoring to determine the effectiveness of the medium. An additional disadvantage of activated carbon is that it collects microorganisms including harmful bacteria and provides a medium upon which such harmful bacteria can multiply. As a result, the activated carbon which is suppose to be purifying the water can end up contaminating the water with harmful bacteria. In an effort to overcome this disadvantage, manufacturers have attempted to provide a bacteriostatic activated carbon media by impregnating activated carbon with silver. However, such efforts have not been totally satisfactory since it is difficult to achieve effective bacteriostatic concentrations of silver and keep within the EPA established guidelines for dissolved silver content. Silver also has other disadvantages associated with its use such as the cost of the silver itself can be prohibitive to economical water treatment.

The present invention overcomes the undesirable characteristics, drawbacks and disadvantages of the prior art by providing a fluid treating apparatus and method which employ metal particulate matter: having a redox potential which relative to the redox potential of the undesirable constituents sought to be treated favors spontaneous oxidation-reduction reactions between the metal and the undesirable constituents and/or having bacteriostatic or bactericidal properties in the case where the undesirable constituent sought to be treated is a bacteria. The metal particulate matter can be of varying mesh size, preferably of from 4 to 400 mesh based on U.S. Standard screen sizes, of any desired shape and is typically arranged in a loose bed confined within a treating tank by means which prevent the escape of the particulate matter but which, at the same time, permit fluid flow therethrough. Alternatively, techniques for adhering the particles into an aggregate porous body with the surface areas freely exposed can be utilized. Suitable techniques for forming such aggregate porous bodies include sintering and processes wherein a binder is utilized which results in all, or substantially all, of the , surface area of the particles freely exposed for contacting fluids to be treated therewith. An important embodiment of the present invention is directed to an apparatus for treating water and a water treating method which employs metal particulate matter such as zinc and copper, as well as mixtures and alloys thereof, to provide removal of undesirable contaminants such as chlorine and bacteria. In this regard, an important aspect of the present invention involves a discovery that such a method will provide economical and long lasting removal of such undesirable contaminants and thereby greatly eliminate the weak link in most treatment systems i.e. maintaining and monitoring the system on a relatively frequent basis.

Another feature of the present invention involves a method of using such a bed of metal particulate matter in conjunction with another type of fluid treating apparatus such as activated carbon, reverse osmosis, or ion-exchange processes. In this regard, an important aspect of the present invention involves the removal of undesireable elements and compounds such as chlorine and bacteria which may be detrimental to the operation and life of other treatment methods such as activated carbon, reverse osmosis and ion-exchange processes.

Another feature of the present invention involves provision of an apparatus and a method of using such a bed of metal particulate matter in conjunction with another type of fluid treating apparatus such as activated carbon, ion-exchange or reverse osmosis. In this regard, an important aspect of the present invention involves the retardation of the growth of bacteria on such a medium and/or the destruction of bacteria which may be present on such medium.

Another feature of the present invention involves adjusting the pH of the fluid and subsequently passing it through such a bed of metal particulate matter. In this regard, an important aspect of the present invention involves regulating the pH of the fluid prior to treatment to enhance the removal of contaminants having pH dependent oxidation-reduction activities.

Another feature of the present invention involves the conjoint use of dual containers having beds of such metal particulate matter arranged in series with a pH feeder interposed therebetween. Such a method of fluid treatment allows the user to take advantage of the pH of the source fluid at the inlet of the first container to treat the contaminants that are more responsive to treatment at the original source fluid pH and then to adjust the pH to treat contaminants which may be more effectively treated at another pH value to subsequently treat the fluid again in the second container.

It is therefore, an important object to the present invention to provide an improved fluid treating apparatus and method.

Another object of the invention is to provide a fluid treating apparatus and method which is economical to use, which has a relatively long life so as to avoid frequent maintenance and monitoring, and which eliminates the need to regenerate the treating medium and, accordingly, the need to dispose of concentrated contaminants inherent in other conventional treatment processes such as reverse osmosis and ion-exchange processes.

Another object of the invention is to provide a novel method of treating undesirable constituents such as chlorine and bacteria present in a fluid such as water without concentrating such constitutents in the treating medium.

Another object of the invention is to provide a fluid treating method which includes treating the fluid by passing the raw fluid containing undesirable constituents through a bed of metallic particulate matter characterized by a redox potential which relative to the redox potential of the undesirable constituents sought to be treated establishes conditions for spontaneous oxidation and reduction reactions between the metal particulate matter and the undesirable constituents when the fluid is in contact with the metal particles.

Another object of the present invention is to provide an improved method of treating fluids wherein the fluids are first passed through a bed of metallic particulate matter to treat undesirable constituents present such as chlorine which may be harmful to a conventional fluid treatment process such as a reverse osmosis process or an ion-exchange process and to then pass the fluid through such a conventional treatment process.

Another object of the present invention is to provide an apparatus for and improved method of treating fluids wherein the fluids are first passed through a conventional fluid treating process such as an activated carbon process and then the fluid is passed through a bed of metal particulate matter to treat undersirable constituents such as harmful bacteria.

Another object of the present invention is to provide an apparatus for and improved method of treating fluid wherein the fluids are passed through a bed containing both metal particulate matter as well as a conventional treating media such as activated carbon, ion-exchange resins, or reverse osmosis membranes to treat undesirable constituents.

Another object of the present invention is to provide an improved method for treating fluids so as to reduce the concentration of undersirable metals to levels which the fluids can be used in a variety of industrial applications by means of a system which does not require continued replenishment of the fluid treating system.

Another object of the present invention is to provide an improved method for treating water to reduce the concentration of undesirable metals to levels wherein the water meets standards for the concentration of such metallic contaminants set for drinking water.

These objects and other objects and advantages of the invention are accomplished by providing fluid treating apparatus which includes a bed of metal particulate matter and a method for treating fluid which includes passing fluid containing undesirable elements and compounds through such a bed of metal particulate matter. The particulate matter is preferably chosen from metals such as zinc and copper as well as mixtures and alloys thereof, having favorable redox potentials relative to the undesirable constituents such as chlorine sought to be treated so as to establish conditions for spontaneous oxidation and reduction reactions between the metal particular matter and the undesirable constituents when the fluid is in contact with the metal particles and/or having bacteriostatic or bactericidal properties in the case where an undesirable constituent sought to be treated is a bacteria.

Figure 1:
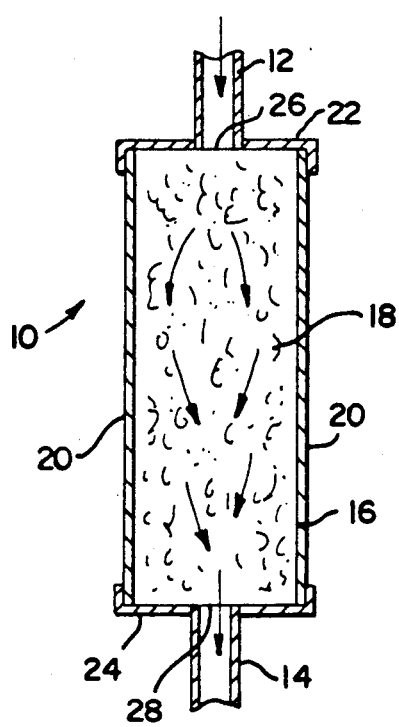
FIG. 1 is a vertical sectional view of one form of fluid treating apparatus of the invention, showing a loose bed of metal particulate matter; fluid treating apparatus of the invention, showing a bed of activated carbon and a bed of metal particulate matter separate from each other but contained in a common housing.

Although an important aspect of the present invention is directed to the treatment of water, especially drinking water, it will be appreciated that the apparatus and method of this invention may also find advantageous utility in the treatment of a variety of other source fluids with various different undesirable contaminants. For purposes of illustration only therefore, this invention will, in most part, be described by reference to an embodiment wherein water is the source fluid being treated.

It has now been discovered that the composition of a given water supply can be altered with respect to certain contaminants therein such as dissolved chlorine and nitrates by bringing the water in contact with metals such as aluminum, steel, zinc, tin, and copper as well as mixtures and alloys thereof. For example, it has been noted that when water containing high concentrations of dissolved chlorine is passed through a canister housing metallic particulate matter such as brass that the detectable chlorine level of the effluent water is greatly reduced, if not totally eliminated.

In addition, the concentration of undersirable metals can be reduced when water is passed through a canister housing metallic particulate material comprising copper and zinc, such as brass. Thus, the concentration of metals such as aluminum, arsenic, barium, cadmium, chromium, copper, gold, iron, lead, mercury, selenium and silver can be reduced when a fluid, such as water, containing such metals, is treated by passing it through a bed of metal particles, comprising copper and zinc, which can be in the form of a brass alloy.

An explanation for this reduction in the concentration of undersirable metals by passing the water or other fluids containing these metals through a bed of metallic particulate material comprising copper and zinc is that there is an electrical field formed of the copper and zinc. In this electrical field, the metals in the fluid become ions which can be replaced by the copper or zinc ions which go into solution. The replaced metallic ion plates out on the brass or other form of copper and zinc metallic particulate. It has been noted that the material plated out is dendritic and porous. Consequently, this plating out does not prevent the metallic particulate material from continuing to function but it does decrease the rate of replacement of undesirable metal from the fluid possibly because turbulence is reduced and the replacement of the undesired metal ion becomes diffusive.

It has also been discovered that such a method of fluid treatment is also effective under certain operating conditions to significantly reduce and/or eliminate the nitrate concentration of the effluent water. Additionally, it has been discovered that fluid treating media containing brass particulate matter acts as an effective bacteriocidal and/or bacteriostatic agent with respect to common bacterial contaminants such as *E. coli* and *Pseudomonas*. It has also been discovered that when water containing dissolved iron, such as ferrous iron, which could stain clothing upon contact therewith is passed through a bed of brass that the effluent water is apparently free of dissolved iron and does not stain clothing upon contact therewith. It has further been discovered that when water contaminated with tannins is passed through a bed of brass that the effluent water is clear and apparently tannin free. As a result of such findings, it is presumed that the present development may have widespread application to other types of inorganic contaminants such as hydrogen sulphide and sulphur dioxide to name but a few as well as organic contaminants.

Moreover, it is believed that the useful life of such a method of fluid treatment under normal operating conditions, would far exceed the useful life of other conventional treating systems. Accordingly, such a finding represents a considerable step forward in the art in that it helps to eliminate one of the major drawbacks of conventional systems, i.e. the need to frequently replenish the active source of treatment and the concomitant need to constantly maintain and monitor the system.

In addition, such a method has wide spread potential application for a variety of domestic, commercial and industrial uses. For example noting that chlorine and iodine are effective anti-bacterial agents, drinking water, especially in a foreign locale, could be treated by initially chlorinating or iodizing the water and then the treated water could be transformed to a more palatable and safe form by contacting the chlorinated or iodized water with metal particles in accordance with the present invention.

As previously noted, this development is intended to have application to other fluid media besides water treatment including other liquid fluid media as well as gaseous fluid media by itself as well as gaseous fluid media dissolved in liquids. For example, removal of hazardous gasses especially the halogens such as chlorine, bromine, and flourine by passing those gasses through a canister housing a bed of metallic matter is contemplated by, and within the scope of, the present invention. Such an application may provide an alternate method of purifying contaminated air such as in a gas mask or may further be used as an alternative to or in conjunction with conventional scrubbing processes.

Referring now to the drawings, FIG. 1 shows the invention to be typically embodied in an apparatus generally designated 10 for treating a fluid such as water, and shows that the apparatus includes an inlet 12, an outlet 14, and a treating tank 16 containing a bed of metal particulate matter 18. The treating tank 16 can be of a variety of shapes and sizes depending upon the desired application. For example, treating tank 16 can take the form of a cannister as depicted in FIG. 1.

As shown in FIG. 1 fluid treating tank 16 comprises impermeable side walls 20, and top and bottom walls 22 and 24. Top wall 22 and bottom wall 24 include inlet 12 and outlet 14 permitting flow of fluid to be treated respectively into and out of the treating tank 16. The fluid treating tank 16 further comprises, foraminous or permeable top and bottom plates 26 and 28 which allow fluid to pass respectively into and out of the fluid treating tank 16 while preventing the escape of the metal particulate matter 18. In accordance with a further aspect of the present invention, the bed of metal particulate matter may be used in combination or conjunction with other fluid treating mediums to provide an enhanced fluid treating system.

Figure 3:
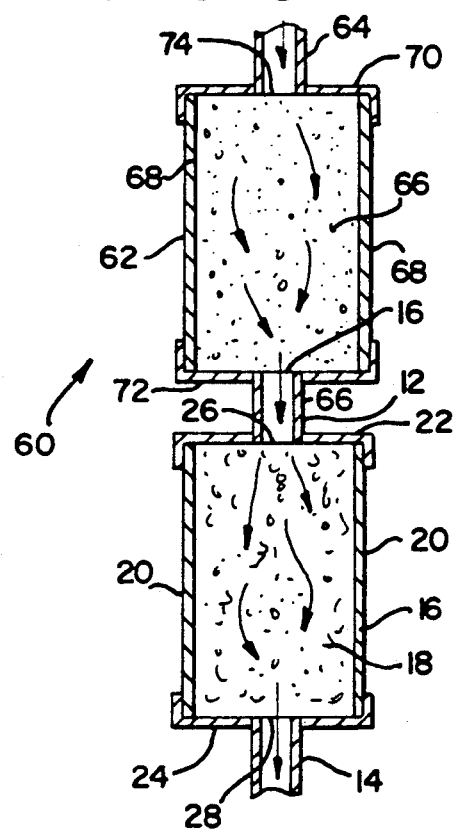
FIG. 3 is a vertical sectional view of one form of fluid treating apparatus of the invention, showing a bed of activated carbon and a bed of metal particulate matter in series.
Figure 2:
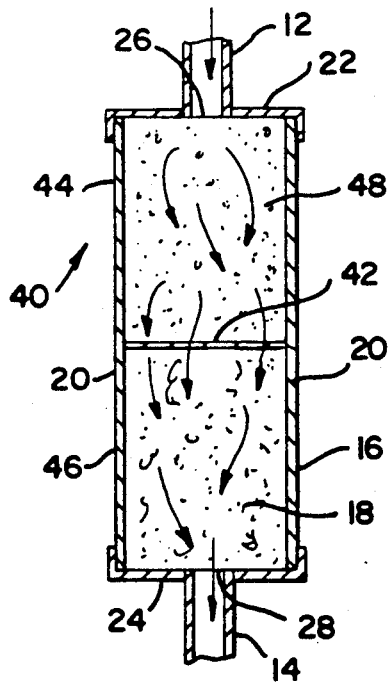
FIG. 2 is a vertical sectional view of one form of fluid treating apparatus of the invention for spontaneous oxidation and reduction reactions between the metal particulate matter and the undersirable constituents when the fluid is in contact with the metal particles and/or having bacteriostatic or bactericidal properties in the case where an undesirable constituent sought to be treated is a bacteria.
Figure 4:
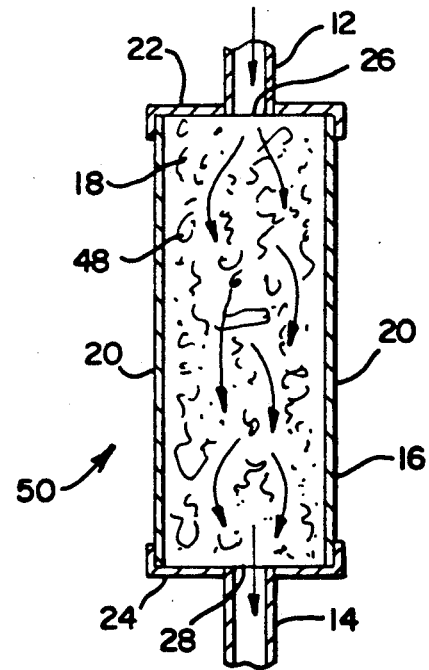
FIG. 4 is a vertical sectional view of one form of fluid treating apparatus of the invention, showing a conventional treatment process such as a bed of activated carbon, and a bed of metal particulate matter contained in a common housing.

FIGS. 2-4 illustrate examples of such enhanced fluid treating systems. In FIG. 2 apparatus 40 includes fluid treating tank 16 which further comprises a middle foraminous or permeable plate 42 dividing the tank 16 into an upper chamber 44 and a lower chamber 46. The upper chamber 44 includes a conventional fluid treating medium such as activated carbon 48 and the lower chamber includes the bed of metal particulate matter 18. In FIG. 4 apparatus 50 includes fluid treating tank 16 which includes a conventional fluid treating medium such as, for example, activated carbon 48 mingled with the metal particulate matter 18. Treating medium 48 could, of course, also be any conventional treating media such as, for another example, a reverse osmosis media in which case fine mesh metal particulate matter 18 could be flocked onto the membrane.

In FIG. 3 apparatus 60 includes two fluid treating tanks 62 and 16 which are connected in series. The fluid treating tank 62 includes an inlet 64 and an outlet 66 which is connected to inlet 12 of fluid treating tank 16. Fluid treating tank 62 includes a conventional treating medium such as a bed of activated carbon 66. The fluid treating tank 62 comprises impermeable side walls 68, and top and bottom walls 70 and 72. Top wall 70 and bottom wall 72 include inlet 64 and outlet 66 permitting flow of fluid to be treated respectively into and out of the treating tank 62. The fluid treating tank 62 further comprises foraminous or permeable top and bottom plates 74 and 76 which allow fluid to pass respectively into and out of treating tank 62 while preventing the escape of the activated carbon 66.

It will be appreciated that the relative positioning of the fluid treating mediums depicted in FIGS. 2 and 3 and described above can be inverted depending upon the desired application. For example, as previously described, if the conventional treating medium is activated carbon it may be desirable to have the bed of metal particulate matter downstream of the activated carbon to treat any harmful bacteria contained in the fluid leaving the bed of activated carbon. On the other hand if the conventional treating medium is a reverse osmosis or ion-exchange medium it may be desirable to have the bed of metal particulate matter upstream of such medium to eliminate constituents such as dissolved chlorine which may be deleterious to such medium.

The present invention contemplates the use of several different metals as well as mixtures and alloys thereof. It is hypothesized, without being limited to any particular theory of the invention, that the treatment process of the present invention, at least with respect to inorganic constituents such as dissolved chlorine, is accomplished by spontaneous oxidation-reduction reactions. Accordingly it is believed that the metal particulate matter should be selected from a group of metals including mixtures and alloys thereof, which are relatively good redox agents relative to the undesirable constituents sought to be treated so as to establish conditions for spontaneous oxidation and reduction reactions between the metal particulate matter and the undesirable constituents when the fluid is in contact with the metal particulate matter.

The relative tendencies of different species to be reduced or oxidized can be predicted from their standard reduction potentials ($E^°$ values at 25° C.). By comparing the $E^°$ values for different species it is possible to determine whether an oxidation-reduction will spontaneously occur. In accordance with the present invention, metals which are relatively good redox agents relative to the elements or compounds sought to be treated are those metals which are predicted to react spontaneously with such elements and compounds.

For example, chlorine dissolved in water having a pH of approximately 7 and at 25° C. exists as HOCl and ClO$^-$ with HOCl predominating on the acid side and ClO$^-$ predominating on the base side. Assuming for simplicity that ClO$^-$ is the reacting species the following redox reactions are representative of those contemplated by the present invention:

| | |
|---|---|
| $Zn(s) \rightarrow Zn^{2+}(aq) + 2e^-$ | $E^° = 0.76$ V |
| $ClO^-(aq) + H_2O + 2e^- \rightarrow Cl^-(aq) + 2OH^-(aq)$ | $E^° = 0.89$ V |

-continued

| | |
|---|---|
| $Zn(s) + ClO^-(aq) + H_2O \rightarrow Zn^{2+} + Cl^-(aq) + 2OH^-(aq)$ | $E = 1.65\ V$ |
| $Cu(s) \rightarrow Cu^{2+}(aq) + 2e^-$ | $E° = -0.34\ V$ |
| $ClO^-(aq) + H_2O + 2e^- \rightarrow Cl^-(aq) + 2OH^-(aq)$ | $E° = 0.89\ V$ |
| $Cu(s) + ClO^-(aq) + H_2O \rightarrow Cu^{+2}(aq) + Cl^- + 2OH^-$ | $E = +0.55\ V$ |

As calculated, both zinc and copper should each react spontaneously with hypochlorite ($ClO^-$) with the zinc theoretically being more spontaneous since it has the more positive potential.

Zinc and copper are preferred metals since both are relatively good reducing agents with respect to common inorganic contaminants such as chlorine and since both can be tolerated in solution in moderate concentrations without adverse effects. While other metals such as iron and aluminum are also theoretically good reducing agents such metals have disadvantages, which limit their applicability to universal commercial use. For example, while relatively high concentrations of iron can be tolerated in drinking water without toxic effects, such concentrations tend to feed iron based bacteria and also tend to stain items such as clothes when used domestically. In this regard, it has now been discovered that when water containing dissolved iron, such as ferrous iron which could stain clothing upon contact therewith, is passed through a bed of brass that the effluent water is apparently free of dissolved iron and does not stain clothing upon contact therewith. Additionally, an iron based bed of metal particulate is inclined to premature clogging. Similarly, aluminum based treatment beds tend to scab, i.e. an oxide film forms on the surface, thus becoming practically ineffective after short use.

In practice it has been found that a zinc and copper alloy, such as brass is more effective in the removal of dissolved chlorine and undesired metals than is either pure zinc or pure copper or a heterogeneous mixture thereof. In addition to the noted effectiveness of brass, brass is also a preferred metal from the viewpoint of chemical safety. This is especially true in aqueous media since brass does not have the violent reactivity to aqueous fluids as do metals such as pure sodium, potassium, calcium or zinc.

A copper/zinc alloy such as brass is also a preferred metal from the viewpoint of effluent dissolved metal concentrations. In this regard, it is noted that by-products of the redox reactions between zinc, copper and alloys thereof with inorganic contaminants such as dissolved chlorine are dissolved zinc, dissolved copper, and mixtures thereof, respectively. When zinc or copper are used alone to treat excessively chlorinated drinking water it is possible to effect dissolved metal concentrations which, while relatively dilute, exceed EPA recommended guidelines. While, as discussed further below, any resulting undesirable metal concentration could be effectively removed by further treatment with conventional treatment processes such as ion-exchange or reverse osmosis processes, it has been found that when a copper/zinc alloy such as brass is utilized as the treatment medium, the resulting dissolved metal concentrations fall well within current EPA guidelines for dissolved zinc and dissolved copper in drinking water.

As noted above, a further embodiment of the present invention is a method for purification whereby the water is passed through both a bed of metallic particulate matter such as brass and a conventional treatment process such as reverse osmosis or ion-exchange or activated carbon. This could be especially advantageous due to the fact that semipermeable membranes such as cellulose acetate often used in reverse osmosis treatment methods are often susceptible to degredation by dissolved chlorine as is divinylbenzene which is often used to cross link ion-exchange resins. Utilization of a bed of brass in conjunction with the reverse osmosis membrane or ion-exchanger could substantially lengthen the life of the membrane or resin. Additionally, each of the reverse osmosis, ion-exchange and activated carbon conventional treatment methods are susceptible to bacterial fouling and/or bacterial buildup. In this regard, it has been found that the use of copper or a copper alloy such as brass in a treating system is effective to combat bacteria such as *E. coli* commonly found in sewage contaminated water supplies as well as other undesirious organisms such as *Pseudomonas*.

It will be appreciated that the term "brass" is used herein to indicate a copper-zinc alloy, in general, and that such alloy can contain other constituents and/or be commonly denominated by different nomenclature. For example, alloys commonly termed bronze containing copper and zinc, such as, but not limited to, architectural bronze composed of approximately 57% Cu-40% Zn-3% Pb, manganese bronze A composed of approximately 58.5% Cu-39% Zn-1.4% Fe-1% Sn-0.1% Mn and manganese bronze B composed of 65.5% Cu-23.3% Zn-4.5% Al-3.7% Mn-3% Fe as well as other metals such as Muntz metal composed of 60% Cu-40% Zn are generally referred to as brasses herein and are within the scope of the present invention.

Where brass is the chosen metal, it has been found that washing the brass such as with a hydrochloric acid solution and then rinsing the brass will cleanse the surface of the brass of contaminants, such as iron filings or other foreign matter, which might interfere with the activity of the brass. However, it has additionally been noted that the surface of the brass which is exposed to the atmosphere or to a source fluid such as water may develop a greenish rust which may be a carbonate and/or oxide complex. When the surface itself is physically scraped to remove the greenish rust, the removed rust also shows excellent purifying tendencies.

Qualitive analysis of water to which chlorine was added and which was treated by being passed through a bed of brass showed that such treating consistently effected a decrease in the amount of chlorine in the water. Set forth below are Examples I and II which describe quantitative anaylsis conducted by independent laboratories of the composition of the brass used to treat the water and of the water treated, respectively, both before and after treatment. Analysis of the brass, as described in Example I below, indicated that passing water through the bed of brass did alter the composition of the brass as might be expected if oxidation-reduction processes were occurring. As shown in Example II below, the independent laboratory analysis of the influent and effluent water passed through the bed of brass did confirm the virtual elimination of the chlorine contained in the influent water.

EXAMPLE I

Water was passed through a cylinder housing a 3 inch by 6 inch bed of 14×30 mesh brass trapped between screens to prevent the escape of the brass. The water passed through the brass bed originated from the Village of Constantine, Mich. water supply which is not chlorinated but which contains dissolved nitrates from approximately 10 to 13 parts per million. Amounts of chlorine, from approximately 2 to 13 parts per million, were introduced into the influent water to test the extent of decrease in the chlorine level. After approximately 51,000 gallons of water had passed through the bed of brass it was observed that the bed had diminished in height about one half inch. A fresh sample of brass from which the bed was composed was analyzed as was a sample of brass taken from the bed after approximately 51,000 gallons of water had passed therethrough.

Elemental composition of these samples was determined by Directly Coupled Plasma-Atomic Emission Spectroscopy using a Beckman Spectraspan VI Spectrometer. Samples were prepared for plasma emission analysis by dissolving 0.1000 grams into 20 milliliters of a 50/50 concentrated nitric acid/distilled water mixture. Total solution weight was then brought to 100.00 grams by the addition of distilled water.

Elemental composition was determined as the average of values obtained from the following emission lines for each element: Copper; 213.598 nm., 233.008 nm.; Iron; 238.204 nm., 259.940 nm., 371.994 nm.; Zinc: 213.856 nm., 206.200 nm., 202.548 nm.; Lead; 405.783 nm., 283.306 nm., 368.348 nm.. The results were:

| BRASS ANALYSIS | | |
|---|---|---|
| | BEFORE TREATMENT | AFTER TREATMENT |
| % Copper | 59.2 | 65.0 |
| % Zinc | 35.2 | 27.8 |
| % Lead | 2.5 | 2.5 |
| % Iron | 0.2 | 0.2 |

Emission wavelengths for tin and aluminum were also examined, but these elements could not be detected at the 1 to 1000 sample dilution.

EXAMPLE II

Two sets of samples of influent and effluent water which had passed through the brass bed of Example I after it had been used to treat approximately 51,000 gallons of water were sent to an independent laboratory for analysis. Sample Set A was unchlorinated tap water supplied by the Village of Constantine, Mich. water supply and sample Set B was tap water to which chlorine was added. The results of the analysis follow:

| PARAMETER | UNITS | IN | OUT |
|---|---|---|---|
| SAMPLE SET A | | | |
| Nitrite Nitrogen | mg/l | 10.35 | 9.34 |
| Nitrate & Nitrite | mg/l | .01 | .01 |
| Organic Nitrogen | mg/l | 10.35 | 9.35 |
| Aluminum (Al) | mg/l | 0.5 | 0.5 |
| Copper (Cu) | mg/l | 0.04 | 0.27 |
| Iron (Fe) | mg/l | 0.05 | 0.34 |
| Potassium (K) | mg/l | 1.00 | 1.47 |
| Sodium (Na) | mg/l | 3.8 | 5.2 |
| Zinc (Zn) | mg/l | 0.12 | 1.3 |

| PARAMETER | UNITS | IN | OUT |
|---|---|---|---|
| -continued | | | |
| SAMPLE SET B | | | |
| Chloride | mg/l | 29.5 | 32.0 |
| Chlorine | mg/l | 13.0 | 0.1 |
| Nitrate Nitrogen | mg/l | 11.35 | 10.69 |
| Nitrite Nitrogen | mg/l | .01 | 0.01 |
| Nitrate & Nitrite | mg/l | 11.35 | 10.69 |
| Aluminum (Al) | mg/l | 0.5 | 0.5 |
| Calcium (Ca) | mg/l | 93.0 | 94 |
| Copper (Cu) | mg/l | 0.05 | .26 |
| Magnesium (Mg) | mg/l | 24.0 | 24.4 |
| Potassium (K) | mg/l | 1.02 | 1.06 |
| Sodium (Na) | mg/l | 17.1 | 17.8 |
| Zinc (Zn) | mg/l | 0.11 | 4.5 |

The preceding Examples are offered to illustrate the method of the present invention and the effect produced thereby and are not intended to limit the general scope thereof. As shown best by the results of Sample Set B of Example II the method of the present invention is effective to remove undesireable contaminants such as dissolved chlorine. The concentration of cations such as zinc and copper cations did increase in the effluent as would be expected if an oxidation-reduction process were taking place.

Additionally, it has been observed that influent tap water having a pH of approximately 6.9 has a pH of approximately 7.2 after passing through the brass bed. Further, it has been noted that the pH value of water, in general, and especially water having acidic pH values, is raised as a result of having been passed through a brass treatment bed. This is an especially advantageous feature of the present invention since chloride ions are commonly present in drinking water and since chloride is the resulting ion after treatment with brass when chlorine is the target contaminant. Chloride ions are potentially corrosive agents in an acidic media. The concommitant increase in pH value of the treated water as it is being treated tends to neutralize the potentially corrosive effect of any existing chloride ions.

As shown by the results of both Sample Sets A and B of Example II the treatment process also effected a decrease in the level of dissolved nitrates in the water. It has been found that transformation of dissolved nitrates is enhanced and the concentration of the dissolved nitrates is significantly reduced by the present treatment process when the fluid medium is at least slightly acidic such as having a pH of 6.5 or less. It has been found that the transformation of dissolved nitrates in an acidic medium is, to some extent, reversible, i.e. it is possible by subsequently increasing the pH value of the effluent to detect the presence of dissolved nitrates. In this regard, it has quite unexpectedly been found that nitrate removal can also be effectively, and apparently nonreversibly, be effected at relatively high pH values such as for example a pH value of 10-12.

Therefore if the undesirable constituent is more effectively removed in an acidic media a conventional acid feeder can be incorporated into the water treatment method. Alternatively, if the undesirable constituent is more effectively removed in a basic media a conventional base feeder pretreatment can be used. Where multiple elements or compounds are treated requiring different pH values the water to be treated may be passed through successive beds of metal particulate matter, such as brass, arranged in series with the appropriate conventional acid or base feeders interposed therebetween.

It has further been found that the speed and degree of removal of contaminants is dependent upon the contact time of the fluid with the metal. Accordingly, increasing the contact surface area of the bed such as by using a smaller metal mesh will enhance the speed and degree of removal. Alternatively, or in conjunction therewith, the fluid flow rate could be decreased to allow a longer contact period. It has still further been found that supplying oxygen to the fluid or metal particulate matter such as by bubbling air through the fluid or exposing the bed of metal particulate matter to the atmosphere can enhance the treatment process.

It has been found that the mesh size of the metal particulate matter can vary appreciably and still be effective at treating the fluid. For example, typical mesh sizes of the metal particulate matter will range from 4 to 400 mesh based on U.S. Standard screen sizes and although mesh sizes both above and below this range can be utilized mesh sizes from 4 to 30 mesh usually will be preferred for most applications. It will be appreciated that the metal particulate matter can be supplied in other alternate forms such as in aggregate porous bodies made by adhering the particulate matter into porous bodies of any desired shape. Suitable techniques for forming such aggregate porous bodies include sintering and processes wherein a binder is utilized which results in all, or substantially all, of the surface area of the particles freely exposed for contacting fluids to be treated therewith.

It has been found that brasses composed of respective percentage, by weight, of copper and zinc, yield different effluent concentrations of dissolved metals. In this regard, and with respect to current effluent limitations, brasses containing approximately a 1:1 ratio of copper to zinc are preferred, brasses containing approximately a 3:2 ratio of copper to zinc are more preferred and brasses containing approximately a 7:3 ratio of copper to zinc are most preferred. It will of course be appreciated that since copper is a better bacteriocidal and bacteriostatic agent than is zinc that increasing the percentage of copper in the brass should produce an enhanced bacteriocidal/bacteriostatic treating media.

In treating fluids, particularly water, to reduce the concentration of undesirable metals therefrom, it has been found possible to use metal particulate matter, comprising copper and zinc in a weight rates of copper to zinc of between about 1:9 and about 9:1, preferably between about 3:7 and about 9:1. It had been found that using the weight ratios of copper to zinc of between about 4:6 and 6:4 in certain instances may increase the effective useful life of the brass alloy in reducing the concentration of undesirable metal in the fluid, particularly water.

It is contemplated that a 20 inch bed of 14×30 mesh brass housed in a cylinder having a 6 inch diameter could accomodate the full pressure water flow rate of a domestic home user and effectively treat influent chlorinated water for many years without replacing the bed of brass.

Set forth below are Examples III and IV which describe quantitative analysis conducted by an independent laboratory of water innoculated with *E. coli* and *Pseudomonas* bacteria, respectively, before and after treatment with each of brass; a mixture of 50% brass and 50% activated carbon; zinc; copper; and, activated carbon.

EXAMPLE III

Initial innoculum *Escherichia coli* was prepared from an overnight stock culture grown on standard methods agar and suspended in phosphate buffered saline. Single strength tryptic soy broth was added to the innoculum suspension to achieve a final tryptic soy broth concentration of 10% so to provide adequate available nutrient to allow bacterial growth.

Approximately 100 cubic centimeters of each of the following test material were placed into respective 400 ml. beakers:

| | Test Materials |
|---|---|
| 1. | Brass shavings (approximate elemental composition: 70% Cu and 30% Zn by weight); |
| 2. | 50:50 mixture of brass (as above) and commercial activated carbon particles; |
| 3. | Particulate zinc; |
| 4. | Particulate copper; |
| 5. | Commercial activated carbon. |

The innoculum (prepared as stated above) was added to each beaker sufficient to bring the fluid level just below the surface of the test material. A microbial count of the innoculum was made prior to addition of the test material. Each beaker was incubated at room temperature for 16 hours, and a microbial count was then performed on 1 ml. of the available fluid.

| | The results* were: | |
|---|---|---|
| Test Material | Initial E. coli Inoculum: CFU/ml Liquid | Final E. coli CFU/ml Liquid |
| Brass | 33,000,000 | <10 |
| 50% Brass/50% Activated Carbon | 33,000,000 | 35,000 |
| Zinc | 33,000,000 | 810,000 |
| Copper | 33,000,000 | 10 |
| Activated Carbon | 23,000 | 3,000,000 |

*The tests using brass, 50% brass/50% activated carbon, zinc and copper were performed on the same day using the same innoculum. The test using activated carbon was performed by the same independent laboratory at a later date using a different inoculum prepared in the same manner as described above.

EXAMPLE IV

Initial innoculum *Pseudomonas* was prepared from an overnight stock culture grown on standard methods agar and suspended in phosphate buffered saline. Single strength tryptic soy broth was added to the innoculum suspension to achieve a final tryptic soy broth concentration of 10% so to provide adequate available nutrient to allow bacterial growth.

Approximately 100 cubic centimeters of each of the following test material were placed into respective 400 ml. beakers:

| | Test Materials |
|---|---|
| 1. | Brass shavings (approximate elemental composition: 70% Cu and 30% Zn by weight); |
| 2. | 50:50 mixture of brass (as above) and commercial activated carbon particles; |
| 3. | Particulate zinc; |
| 4. | Particulate copper; |
| 5. | Commercial activated carbon. |

The innoculum (prepared as stated above) was added to each beaker sufficient to bring the fluid level just below the surface of the test material. A microbial count of the innoculum was made prior to addition of the test material. Each beaker was incubated at room temperature for 16 hours, and a microbial count was then performed on 1 ml. of the available fluid.

The results were:

| Test Material | Initial *Pseudomonas* Inoculum: CFU/ml Liquid | Final *Pseudomonas* CFU/ml Liquid |
|---|---|---|
| Brass | 2,300,000 | 20,000 |
| 50% Brass/50% Activated Carbon | 2,300,000 | 1,300,000 |
| Zinc | 2,300,000 | 1,000,000 |
| Copper | 2,300,000 | 15,000 |
| Activated Carbon | 2,300,000 | 2,000,000 |

The preceding Examples are offered to illustrate the method of the present invention and the effect produced thereby and are not intended to limit the general scope thereof. As shown above copper and brass both proved to be exceptionally effective bacteriocidal agents when used alone as treating medias. As best illustrated by Example III, activated carbon provided a breeding ground for bacterial growth and over a 100 fold increase in bacteria was experienced when activated carbon was used alone. However, by mixing brass shavings with the activated carbon, an effective bacteriostatic media was achieved. It will of course be appreciated that copper or brass can be used in conjunction with other fluid treating processes such as ion-exchange and reverse osmosis processes to achieve similar bacteriocidal/bacteriostatic medias. It will further be appreciated that the metal bacteriocide can be discrete from the other treating media or integrated therewith such as by impregnating activated carbon with copper or brass. Example IV illustrates that the present invention is also effective to control the growth of organisms having a greater resistance to antimicrobial agents such as *Pseudomonas*.

Additional tests were performed to establish the effectiveness of the brass in reducing the concentration of undesirable metals in fluids, especially water.

EXAMPLE V

Brass alloy filings (5 pounds) containing about 50 weight percent copper and about 50 weight percent zinc were placed on a 0.5 inch thick bed of quartz wool in a polytetrafluoropolyethylene tube, having an inside diameter of 1.75 inches and a length of 20 inches. The water solution was fed upward through the bed of quartz wool.

The flow of water through the brass was at a rate slightly lower than one gallon per minute. Flow of water was continued until any one of the metals in the water reached the maximum allowable effluent level. This occurred after 238,000 gallons of water had flown through the brass. At this time, the water was analyzed for the content of other metals and contaminants. The effluent water had no noticeable additional taste or odor.

| CHEMICAL | CONCENTRATIONS (mg/l) | |
|---|---|---|
| | INPUT | OUTPUT |
| Trihalomethane | 0.51 | 0.51 |
| Lead | 0.16 | 0.0009 |
| Fluoride | 8.20 | 6.88 |
| Nitrate | 30.2 | 19.9 |
| Barium | 10.0 | 0.000 |
| Arsenic | 0.33 | 0.001 |
| Cadmium | 0.030 | 0.003 |
| Chromium (VI) | 0.152 | 0.052 |
| Chromium (III) | 0.163 | 0.065 |
| Selenium | 0.105 | 0.000 |
| Mercury | 0.0063 | 0.000 |
| Endrin | 0.0008 | 0.0008 |
| Lindane | 0.013 | 0.013 |
| Methoxychlor | 0.30 | 0.30 |
| Toxaphene | 0.016 | 0.016 |
| 2,4-D | 0.30 | 0.30 |
| Silver | 0.032 | 0.032 |
| Copper | 0.000 | 5.88 |
| Zinc | 0.000 | 8.99 |
| Sulfur | 0.50 | 0.000 |
| Chlorine | 2.0 | 1.34 |

EXAMPLE VI

This test was performed using brass containing about 50 weight percent copper and 50 weight percent zinc and also having ganular activated carbon in a polyvinyl chloride cylinder having a nominal outside diameter of 3.5 inches and polyvinyl caps. The cylinder had a length of 12.5 inches. Water was passed through the cylinder at a rate of 1 gallon per minute. The input and output was were analyzed for chemical content with results as follows:

| CHEMICAL | CONCENTRATIONS (mg/l) | |
|---|---|---|
| | INPUT | OUTPUT |
| Trihalomethane | 0.53 | 0.07 |
| Lead | 0.12 | 0.000 |
| Fluoride | 8.12 | 1.07 |
| Nitrate | 30.0 | 5.37 |
| Barium | 10.0 | 0.02 |
| Arsenic | 0,37 | 0.000 |
| Cadmium | 0.030 | 0.004 |
| Chromium (XI) | 0.150 | 0.03 |
| Chromium (III) | 0.151 | 0.008 |
| Selenium | 0.108 | 0.006 |
| Mercury | 0.006 | 0.000 |
| Endrin | 0.0008 | 0.0001 |
| Lindane | 0.014 | 0.003 |
| Methoxychlor | 0.33 | 0.07 |
| Toxaphene | 0.018 | 0.001 |
| 2,4-D | 0.33 | 0.077 |
| Silver | 0.030 | 0.008 |
| Copper | 0.000 | 2.23 |
| Zinc | 0.000 | 2.39 |

EXAMPLE VII

The unit used in this test was a fiber wound reinforced resin cylinder, 7.87 inches in diameter and 35 inches in length. The bottom of the cylinder is connected to a cylindrical plastic section which acts as a base that keeps the unit erect. The unit contained brass having a composition of about 50 weight percent copper and 50 weight percent zinc and a granular activated carbon. The water flow rate was 6.1 gallons per minute. The test was continued until one of the metallic inorganic elemental components reached the maximum allowable effluent concentration. This occurred with chromium after 393,500 gallons of water passed through the unit. The input water and the output water were analyzed for chemical content with results as follows:

| CHEMICAL | CONCENTRATIONS (mg/l) | |
|---|---|---|
| | INPUT | OUTPUT |
| Trihalomethane | 0.50 | 0.039 |
| Lead | 0.15 | 0.009 |
| Fluoride | 8.00 | 0.00 |
| Nitrate | 30.0 | 7.9 |
| Barium | 10.0 | 0.000 |
| Arsenic | 0.33 | 0.002 |
| Cadmium | 0.031 | 0.007 |
| Chromium (VI) | 0.152 | 0.044 |
| Chromium (III) | 0.153 | 0.045 |
| Selenium | 0.105 | 0.000 |
| Mecury | 0.0063 | 0.000 |
| Endrin | 0.0008 | 0.0008 |
| Lindane | 0.013 | 0.0035 |
| Methoxychlor | 0.30 | 0.032 |
| Toxaphene | 0.015 | 0.003 |
| 2,4-D | 0.30 | 0.071 |
| Silver | 0.032 | 0.002 |
| Sulphur | 0.50 | 0.000 |
| Chlorine | 2.0 | 0.39 |

EXAMPLE VIII

Chlorine (3 parts per million) and lead (2 parts per million) were added to normal city water and passed through a unit containing brass (9.95 cubic inches) comprised of copper (50 weight percent) and zinc (50 weight percent) and granular activated carbon (73.94 cubic inches) at a rate of 0.5 gallons per minute. After 10,000 gallons of the water was passed through the brass, chemical analysis of the effluent water showed that 99.1 weight percent of the chlorine and 99.4 weight percent of the lead had been removed from the water.

EXAMPLE IX

A test using brass alloy containing about 50 weight percent copper and about 50 weight percent zinc and containing high grade carbon was performed with normal drinking water from Nottingham, England and with this same drinking water spiked with certain metallic contaminants.

| CHEMICAL | CONCENTRATION (PARTS PER MILLION) | |
|---|---|---|
| | INFLUENT | EFFLUENT |
| NORMAL DRINKING WATER | | |
| Copper | 0.11275 | 0.02575 |
| Lead | <0.01 | <0.01 |
| Cadmium | <0.01 | <0.01 |
| Arsenic | <0.01 | <0.01 |
| Iron | 0.96 | 0.25 |
| Aluminum | 0.0275 | 0.0125 |
| Chloride | 32.5 | 31.5 |
| Chlorine | 0.635 | 0.05 |
| SPIKED DRINKING WATER | | |
| Copper | 5.00 | 0.018 |
| Lead | 5.00 | <0.01 |
| Cadmium | 1.00 | <0.01 |
| Arsenic | 0.24 | <0.01 |
| Iron | 1.00 | 0.01 |
| Aluminum | 0.98 | 0.01 |
| Chloride | 237.00 | 162.00 |
| Chlorine | 5.00 | <0.05 |

EXAMPLE X

A test was performed with ordinary drinking water having a hardness of 280 milligrams per liter and a pH of 6.98. The water was passed through a brass alloy containing about 50 weight percent copper and about 50 weight percent zinc in a column having a depth of 250 millimeters and a diameter of 41 millimeters with the following results:

| CHEMICAL | CONCENTRATION (mg/l) | | | |
|---|---|---|---|---|
| | AFTER ONE PASS THROUGH COLUMN | AFTER 24 HRS. | 48 HRS. | 96 HRS. |
| Copper | 0.10 | 0.0 | 0.01 | 0.02 |
| Zinc | 0.57 | 0.1 | 0.17 | 0.42 |
| Hardness | 260 | 13 | 12.4 | 56 |

EXAMPLE XI

A test performed passing normal drinking water having lead, copper, zinc, iron, aluminum and nitrate ions added thereto through a brass alloy comprising about 50 weight percent copper and about 50 weight percent zinc for 18 hours at a rate of 600 mil. per minute.

| CHEMICAL | CONCENTRATIONS (mg/l) | |
|---|---|---|
| | INPUT | OUTPUT |
| Lead | 2.05 | 0.1 |
| Iron | 2.025 | 0.075 |
| Copper | 0.85 | 0.05 |
| Aluminum | 0.1 | <0.005 |
| Zinc | 1.225 | 1.225 |
| Nitrate | 75 | 75 |

EXAMPLE XII

A test was performed with normal drinking water to which chemicals were added. The water was passed through brass comprising about 50 weight percent copper and about 50 weight percent zinc with the following results:

| CHEMICAL | CONCENTRATIONS (mg/l) | |
|---|---|---|
| | INFLUENT | EFFLUENT |
| Aluminum | 1.3 | 0.03 |
| Arsenic | 1.2 | <0.05 |
| Cadmium | 1.3 | 0.02 |
| Chlorine | 3.0 | <0.02 |
| Iron | 1.4 | 0.06 |
| Lead | 1.3 | <0.05 |
| Mercury | 1.4 | <0.05 |
| Lindane | 5.0 | <0.1 |
| Dieldrin | 2.6 | <0.1 |
| Calcium Hardness | 138 | 98 |
| Magnesium Hardness | 144 | 76 |
| Total Hardness | 182 | 174 |
| Suspended Solids | 111 | 6 |

EXAMPLE XIII

A test was performed to compare the effectiveness of brass comprising about 50 weight percent copper and brass comprising about 50 weight percent zinc with brass comprising about 85 weight percent copper and about 15 weight percent zinc. The brass in each instance was contained in a cylinder 10 centimeters high and 17/8 inches in diameter. The water (200 ml) containing 2.09 parts per million of lead added as lead nitrate was passed through the brass. The effluent lead in each instance analyzed less than 0.01 parts per million.

EXAMPLE XIV

Aluminum, arsenic, cadmium, lead and mercury were added to drinking water. The water was passed through brass containing about 50 weight percent copper and about 50 weight percent zinc at a flow rate of approximately 0.50 gallons per minute with the following results.

| METAL | CONCENTRATION (PARTS PER MILLION) | |
|---|---|---|
| | INFLUENT | EFFLUENT |
| Aluminum | 0.46 | <0.20 |
| Arsenic | 0.46 | 0.071 |
| Cadmium | 0.098 | 0.011 |
| Lead | 0.47 | <0.05 |
| Mercury | 0.013 | 0.000 |

EXAMPLE XV

Drinking water was passed through brass filings comprising about 50 weight percent copper and 50 weight percent zinc. The input and output waters were analyzed for chemical content with the following results:

| CHEMICAL | CONCENTRATIONS (mg/l) | |
|---|---|---|
| | INPUT | OUTPUT |
| Iron | 0.260 | 0.017 |
| Manganese | 0.036 | 0.001 |
| Copper | 0.0175 | 0.001 |
| Fluoride | 0.5 | 0.0 |
| Magnesium | 180.0 | 101.0 |
| Zinc | 0.101 | 0.001 |
| Calcium | 76.0 | 45.0 |

EXAMPLE XVI

Brass filings (57 pounds) containing about 50 weight percent copper and 50 weight percent zinc were placed into a 5 gallon container open at its top and having a spout for the amount of liquid near its bottom. Water (5 gallons) having a hardness of 23 grains was poured into the container through its top opening. The water passed through the brass filings and was removed from the container through the spout. The water removed from the container was analyzed for its pH and hardness. Then the water was pouted back into the container and through the brass filings and this water on being removed from the container through the spout was also analyzed for ph and hardness. This treatment was repeated for a total of 4 cycles with the following results.

| TIME (MINUTES) | PH | HARDNESS (GRAINS) |
|---|---|---|
| CYCLE 1 | | |
| 0 | 7 | 23 |
| 10 | 7.2 | 22 |
| 15 | 7.3 | 21 |
| 25 | 7.5 | 20 |
| 35 | 7.5 | 19.5 |
| 60 | 8.0 | 18 |
| CYCLE 2 | | |
| 10 | 8.0 | 18 |
| 20 | 8.1 | 17 |
| 30 | 8.5 | 16 |
| 40 | 8.5 | 15 |
| 50 | 8.6 | 15 |
| 60 | 9.0 | 14 |
| CYCLE 3 | | |
| 10 | 6.0 | 14 |
| 20 | 6.2 | 13 |
| 30 | 6.3 | 12 |
| 40 | 7.0 | 10 |
| 50 | 7.5 | 8 |
| 60 | 7.8 | 7 |
| *pH adjusted to 6.0 | | |
| CYCLE 4 | | |
| 10 | 8.1 | 7 |
| 20 | 8.5 | 6 |
| 30 | 8.7 | 5 |
| 40 | 9.0 | 4 |
| 50 | 9.5 | 3 |
| 60 | 10.0 | 2 |

The lowering in the hardness of water passed through brass containing about 50 weight percent zinc and about 50 weight percent zinc demonstrates the effectiveness of the process of the present invention.

In addition to chemically treating undesirable constituents the method of the present invention also has application to physically filtering undesirable suspended solids. This aspect of the present invention has particular application to removing suspended iron from water which iron is present in the water naturally, as a result of pretreatment such as by chlorination, or as a result of reaction with the bed of metallic particles utilized in the present method. Where the water is pretreated with chlorine to treat dissolved iron, the present method will not only filter the resulting suspended iron but also will treat the remaining chlorine in the water. The cannister housing the bed of metal particulate matter can be periodically backwashed to remove any filtered matter which has collected in the bed and to declog the bed. However, unlike in other treatment methods such as reverse osmosis and ion-exchange methods, such backwashing does not result in the dumping of concentrated undesirable constituents.

Another alternative embodiment of the present invention is a method for purification whereby the water is passed through both a bed of metallic particulate matter such as brass and a bed of filter material and/or filter aid such as sand to enhance filtration of undesirable suspended matter.

It will be appreciated by those skilled in the art that many modifications and variations may be made without departing from the spirit and scope of the present invention. Accordingly the present invention is to be limited in scope only by the appended claims.

I claim:

1. A method of treating drinking water containing undesirable inorganic constituents which include chlorine to reduce the concentration of said chlorine in said inorganic constituents having a first redox potential, said method comprising passing said drinking water containing chlorine through a bed of metal particles, said metal particles having a second redox potential such that relative to said first redox potential conditions are established for spontaneous inorganic oxidation and reduction reactions between said chlorine and said metal particles when said drinking water is in contact with said metal particles, said metal particles selected from the group consisting of zinc and copper.

2. The method of claim 1 wherein said metal particles are zinc.

* * * * *